8082X
J. Kinman,
Elevator.
Patented Mar. 15, 1834.
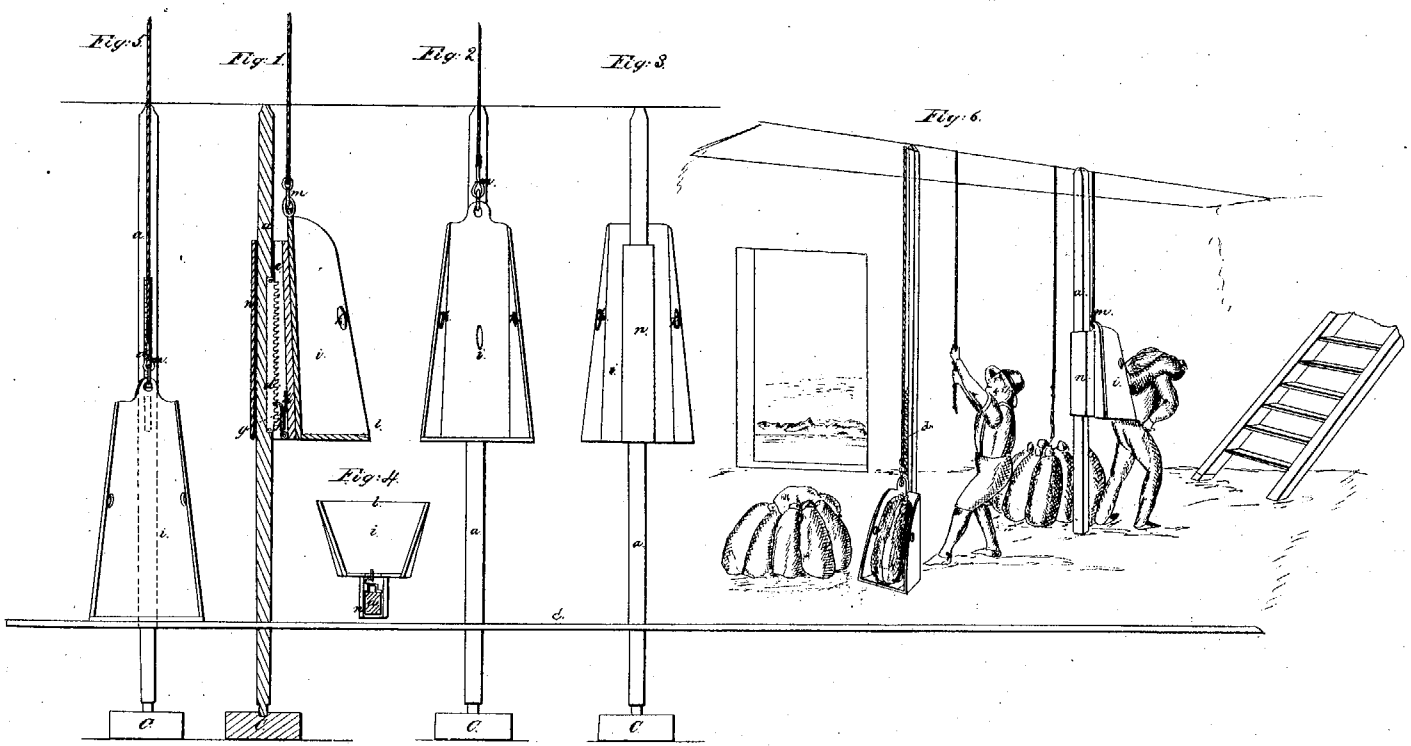
AM. PHOTO-LITHO. CO. N.Y. (OSBORNE'S PROCESS.)

John Kinman of Hartley Township Pennsylvania

Letters Patent.

The schedule referred to in these Letters Patent and making part of the same, containing a description in the words of the said John Kinman himself of his improvement in raising bags of flour, grain &c. in order to be shouldered" called "the assistant Loader,"

To all to whom these presents shall come

Be it known that I John Kinman, of the Township of Hartley, in the County of Union, and State of Pennsylvania have invented a new and useful improvement in raising bags of flour, grain &c in order to be shouldered, called "the assistant loader" and that the following is a full and exact description of the construction and operation of the said machine as invented or improved by me. —

This machine is composed of the following parts and pieces viz. First an upright post nine and a half feet long and three inches square, which may be brought to a point at the top, Eighteen inches of the lower part of this post is to extend through the floor, and to rest on a pivot, which is a part of the post, at the lower end of the same, The part which goes through the floor, is made round, and the lower extremity of the post (which is the pivot before mentioned) is also to be made smaller & round and is two in diameter and three long. This pivot is to work or turn easily in a piece or block of wood, in which is a hole of a proper size to receive and suit the pivot. This piece or block must be made fast, and the post so fitted in it that the post which passes through a round hole in the floor shall stand firmly upright, yet may be easily turned round, Again there is a piece of iron Drawing which is two feet long, and one inch square, which is notched
on one side the whole length. These notches are each one
inch in length and a half an inch deep at the upper part
on which the hook (to be described) catches and rests. The
upper part of this notch or tooth should be nearly horizontal
when the iron is placed in the post, yet slightly inclining
downwards at its inner extremity. The notches which are
twenty four in number are of the bredth of the piece of
iron, In each end of the piece of iron there is a hole
to admit a screw or nail by which it is fastened in
the centre of one side of the post lengthwise it being
inserted half an inch deep, with the teeth outside
The, upper and lower teeth may be ommitted so as to
leave room for these screws, thus leaving only twenty
two teeth, This will make the lower end of the iron
three feet from the floor, Again there is a piece of
wood tapering towards the top which is three feet
three inches long, and three inches by two and a half
inches at the lower end and three inches by one inch
at the top. This piece of wood is guttered in the side
which is three inches broad at top and bottom, from
one extremity to the other, in the middle of the side
The gutter being about a half an inch deep and an
inch wide, so that it may easily slide up and down
the post, over the notches in the piece of iron above
described Again there is an iron hook, about six inches long, which
is set in the end of the last described piece of wood, This hook is fas
tened with an iron pin, as pivot which crosses the said gutter, passing
through the lower end of the hook, On this pin the hook turns
The hook is made of such a form at its upper end as to fit and
catch in the said notches of the iron bar, so that when the grooved
taper piece of wood is raised, the hook will slide over the notches and when it is let down, it will catch and rest firmly on one of them. There is also a small iron pin set in across the gutter over the front of the hook, to keep the hook from coming forward, any farther than to catch, the depth of the notches. a A small spring is set in behind the hook to press it forward, The hook should be made to play freely, There is also a large or main box open at one side and at top of the following pieces. First the back board which is three feet nine inches long, and fourteen inches broad at the bottom, and twelve inches broad at the top Secondly of the bottom board, fourteen inches long at its back and where it Joins, the back board, and twenty one inches long from side board to side board, and fifteen inches in breadth from back to front. —— The front of this bottom board may be rounded in front from the outer edge of the side boards, Thirdly, the two side boards of this main box are each fourteen inches broad at the bottom, and three feet three inches long., The front edges of ^each of these side boards, are very gradually curved from the bottom until near the top, when they are each suddenly rounded off at the top to their back edges, about an equal distance from top and bottom near the outward edges of each of the side pieces, there is a hole or ear cut out large enough to receive a man's hand, There is also a notch cut in the under side of the bottom board, near its front edge, of a size to receive the ends of the fingers of a man's hand, so as to pull the box a little forwards when it will be loosened from the notches and fall to the floor. This notch is not to be cut through the wood as the above ears are to be, The back piece of the box is rounded off at the top, near its top, and in the centre of the part rounded off,. There is fastened a staple in which the hook of the hoisting rope of the mill, or other rope is to be caught in order to raise the box., The above described ~~grooved topped~~ piece is firmly fastened by screws or otherwise, lengthwise to the centre of the back of the main box

[illegible]

with the grooved side out. Around the tapered grooved piece is a box of which the said grooved tapered piece is a side of the other three sides of this smaller box are each three feet three inches long. The two sides which join on the tapered piece are seven inches broad at the bottom, and five and one fourth inches broad at the top, The remaining side, opposite the tapered piece is five and one fourth inches broad at both top and bottom, This box is open at top and bottom, — This box and the main box are strongly united, according to the above description, with nails or screws The smaller box is lastly slipped over the post, the side of which, on which the notches are, being turned towards the gutter in which they slide, The size of the machine may be varied while the principle remains the same, When the machine is to be used, it is drawn down by the ears or notch or if pulled forward it will fall to the floor, — The bag of flour, plaister &c. is slightly raised so as to set the end thereof on the bottom board of the main box, when down, so that the bag will stand upright leaning against the back board The jack rope of the hoist-jack of the mill (when the machine is used in a mill) is to be pulled by the hand, and the hoisting rope fastened to the staple in the back board raises the boxes and bag to a height to suit the Miller or other persons shoulder, when the jack rope is let go of, and the hook in the smaller box will catch on the proper notch and the boxes will remain elevated, — The Miller can then apply his shoulder and letting the bag lean on his shoulder and walk off with it easily, — — This machine may be raised and used, by either horse, water or hand power, by fixing a few pulleys or otherwise, in a mill, a barn or elsewhere, — In testimony whereof I have hereunto hereunto set my hand this fifteenth day of February, Anno Domini, one thousand eight hundred and thirty four, Witness E. Bradford Todd } John Kirman John Detwiler }

1584 2ds

Drawing

Cx?

Ck.